O. P. NORMAN.
MECHANICAL MOVEMENT.
APPLICATION FILED AUG. 17, 1916.
1,210,353.
Patented Dec. 26, 1916.
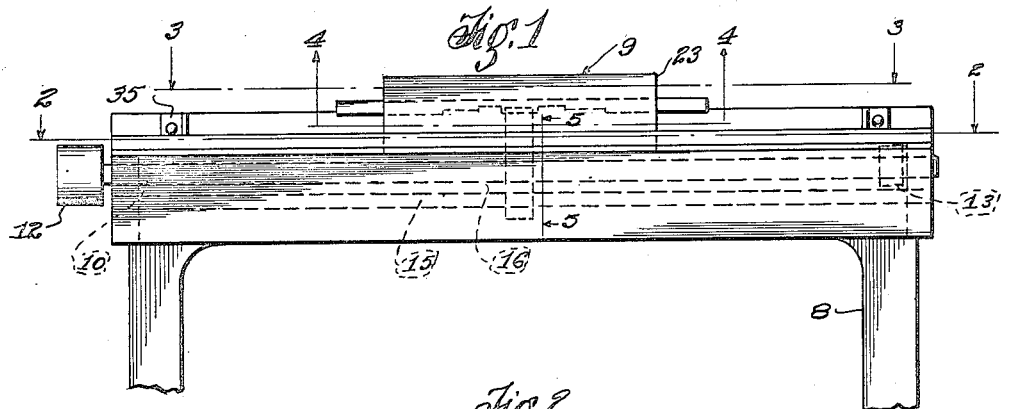
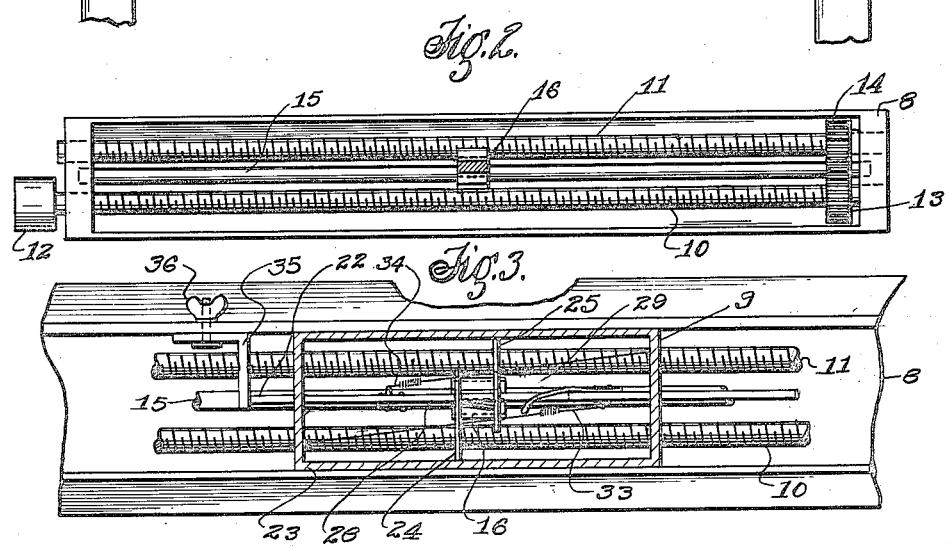
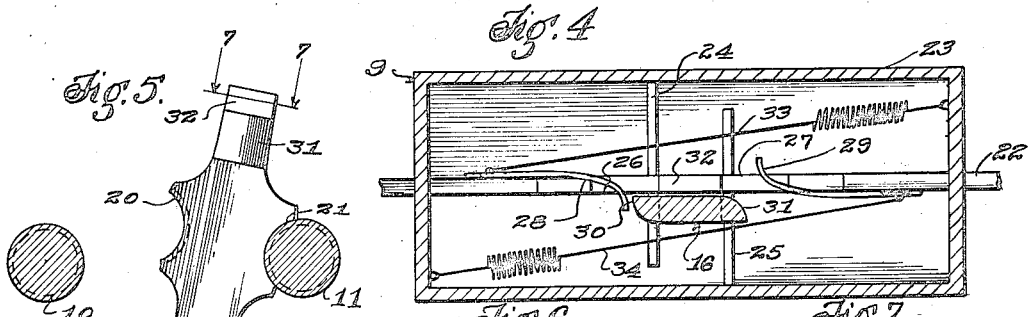
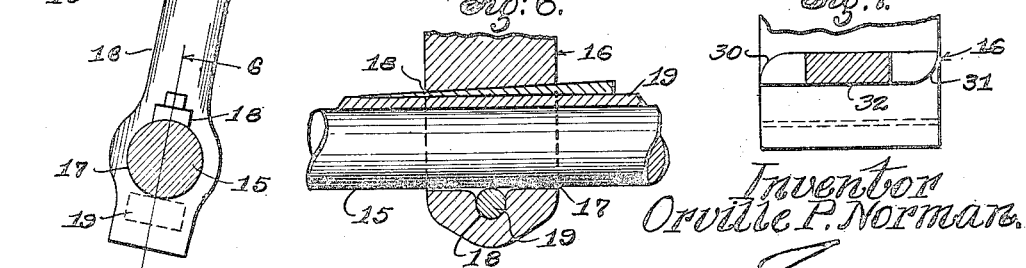
Inventor
Orville P. Norman.
by Edmund A. Strause
Atty.

UNITED STATES PATENT OFFICE.

ORVILLE P. NORMAN, OF LOS ANGELES, CALIFORNIA.

MECHANICAL MOVEMENT.

1,210,353. Specification of Letters Patent. Patented Dec. 26, 1916.

Application filed August 17, 1916. Serial No. 115,403.

*To all whom it may concern:*

Be it known that I, ORVILLE P. NORMAN, a citizen of the United States, residing at Los Angeles, in the county of Los Angeles and State of California, have invented new and useful Improvements in Mechanical Movements, of which the following is a specification.

This invention relates to mechanical movements, and pertains especially to a reciprocating movement.

It is an object of this invention to provide a mechanical movement which is adapted to reciprocate a carriage and transform rotary into reciprocating movement.

It is another object of this invention to provide a mechanical movement of the character described which is especially suitable for changing the direction of movement of a carriage adapted to be connected to a mechanism for holding cutlery while the latter is ground.

In addition to the broader features of the invention there are certain details of design whereby certainty of operation, smoothness of movement, uniformity of speed, strength and simplicity of structure are secured.

I have illustrated an embodiment of my invention in the accompanying drawing, in which:

Figure 1 is a front elevation of a table with my improved mechanical movement mounted thereon, portions of the leg of the table being broken away. Fig. 2 is a section as seen on the line 2—2 of Fig. 1. Fig. 3 is an enlarged fragmentary section as seen on the line 3—3 of Fig. 1. Fig. 4 is an enlarged section as seen on the line 4—4 of Fig. 1. Fig. 5 is a detail sectional view as seen on the line 5—5 of Fig. 1. Fig. 6 is a fragmentary section as seen on the line 6—6 of Fig. 5. Fig. 7 is an enlarged section as seen on the line 7—7 of Fig. 5, portions of the holder being shown broken away.

Referring more particularly to the drawing, 8 indicates a table which may be of any convenient construction suitable for carrying a reciprocating carriage 9 and screws 10 and 11. Screw 10 extends longitudinally of the table 8 and is mounted in suitable bearings for rotation. Upon one end thereof and overhanging the table is a pulley 12 adapted to be connected by belting or other means to the driving mechanism. At the opposite end of screw 10 is a gear 13. Disposed parallel to screw 10 and in substantially the same horizontal plane, is the screw 11 which is rotatably mounted on the table and is provided at one end with a gear 14 meshing with gear 13. The screws and gearing are so arranged that upon rotation of screw 10, screw 11 will be rotated in the opposite direction. Both screws are right handed or left handed so that a nut which meshes with screw 10 will be moved in the opposite direction to a nut which meshes with screw 11. Disposed below the plane of screws 10 and 11 is a guide rod 15 which is cylindrical in form and adapted to carry a conveyer 16 for sliding and pivotal movement thereon.

Referring particularly to Figs. 5, 6 and 7, conveyer 16 comprises an arm having an aperture 17 adjacent its lower end in which is disposed the shaft 15. To provide for free sliding movement of conveyer 16 the aperture 17 is recessed as indicated at 18 and a roller 19 placed therein. The recess and roller are of such size that the upper surface of the roller is substantially tangent to the aperture 17. In order to provide stability for the conveyer and prevent it from rocking in a longitudinal plane upon the guide rod 15, a way 18 opening to the aperture 17 is cut in the conveyer and a bar 19 is wedged therein so that conveyer 16 is braced against rocking longitudinally and yet may slide upon the guide rod.

Intermediate the ends of conveyer 16 are segmental nuts 20 and 21 disposed on opposite sides of the conveyer and so arranged that when the conveyer rests against one screw the threads on the nut will mesh with threads on the screw. When rocked in the opposite direction the threads on the opposite side of the conveyer arm will mesh with the opposite screw. In this manner upon rotation of the screws the conveyer is carried in opposite directions depending upon which screw it is in mesh with. In order to maintain the conveyer in engagement with either screw and to transfer the conveyer from one screw to the other for changing the direction of movement a holder bar 22 is provided. The holder bar is slidingly mounted within a carriage housing 23 and extends through apertures in opposite ends thereof.

Secured to the opposite walls of carriage 23 are guiding bars 24 and 25 which are spaced from each other and permit rocking movement of conveyer 16 transverse to the holder bar 22. On opposite sides of the center of holder bar 22 are openings 26 and 27 through which the upper part of the conveyer may pass in its movement from one side of the holder bar to the other. Overlying the openings 26 and 27 are spring fingers 28 and 29 which are inclined away from the bar. Adjacent the upper end of the conveyer arm 16 are oppositely inclined surfaces 30 and 31 arranged to be engaged by the fingers 28 and 29.

The construction is such that the holder bar when in mid-position engages the lug 32 at the top of the conveyer arm and holds the conveyer in engagement with either screw 10 or 11 depending upon which side of the holder bar the conveyer is disposed. Upon movement of the holder bar to the right of position shown in Fig. 4, spring fingers 28 will ride over inclined surface 30 and tend to force the conveyer toward the bar. When the lug 32 reaches the openings 26 the spring fingers would snap the conveyer bar to the opposite side of the holder bar, the lug 32 passing through opening 26. The holder bar is then retracted to its normal position with respect to the housing 23 by means of tension springs 33 and 34. The lug 32 will then be disposed upon the opposite side of bar 22 and in a position midway between openings 26 and 27. In this position it is held against the opposite screw and the conveyer 32 is moved in the opposite direction carrying with it the carriage 9 by reason of the abutting guide bars 24 and 25.

In Fig. 3 the conveyer is shown passing through opening 26 in the holder bar. Movement of holder bar 22 is effected by means of an abutment 35 which is preferably in the form of an angle and secured in position upon the table 8 by means of a wing nut 36, so that the position of the abutment may be adjusted. A similar abutment is secured on the opposite side of holder bar 22. As the carriage 23 is moved by means of the conveyer to the left or right a position will be reached where holder bar 22 engages an abutment, thus in Fig. 3 the holder bar is shown engaged with abutment 35. Further movement of the carriage moves the holder bar with respect to the conveyer 16. When an opening in the holder bar is opposite to the lug on the conveyer the spring finger snaps it to the opposite side of the bar and the tension springs return the holder bar to mid-position locking the conveyer to the screw on the opposite side.

The conveyer and carriage then move in the opposite direction until the holder bar 22 engages the abutment at the opposite end of the machine. The holder bar is then moved relative to the conveyer and the spring finger on that side snaps the conveyer through an opening into engagement with the screw on the opposite side, where it is locked by the returning to intermediate position of the holder bar. In this manner the conveyer and carriage are reciprocated, the speed of movement being uniform in both directions. At the end of the movement there is a quick reversal when the conveyer and carriage travel in the opposite direction.

The distance of travel of the conveyer and carriage is fixed by adjustment of the position of the abutments. This is especially advantageous in the grinding of cutlery where blades of different lengths are ground. The uniform movement of the conveyer throughout its travel is also an important factor in grinding machines as it effects a uniform grinding of the blade as it is moved across the grinding stone.

What I claim is:—

1. A mechanical movement, comprising the combination of a pair of screws spaced from each other, a conveyer therebetween having threads thereon and arranged to be moved into engagement with either of said screws, a holder for maintaining said conveyer in engagement with either screw, means on said holder to transfer said conveyer from one screw to the other, and means to move said holder relatively to said conveyer to effect said transfer.

2. A mechanical movement, comprising the combination of a pair of screws spaced from each other, a conveyer having threads arranged to be swung into engagement with either screw, a holder for said conveyer arranged to hold the latter in engagement with either screw, means on said holder to transfer said conveyer from one screw to the other, and means to move said holder relative to said conveyer to effect said transfer.

3. A mechanical movement, comprising the combination of a pair of screws spaced from each other, a conveyer arranged therebetween having threads thereon and arranged to be moved into engagement with either of said screws, a holder for maintaining said conveyer in engagement with either of said screws, said holder slidably arranged with respect to said conveyer, means on said holder to transfer said conveyer from one screw to the other, and means to slide said holder for effecting said transfer.

4. A mechanical movement, comprising the combination of a pair of screws spaced from each other, a rod disposed below and between said screws, a conveyer pivotally and slidably mounted thereon, said conveyer having threads arranged to be moved into engagement with the threads of either screw, a holder for maintaining said conveyer in engagement with either of said screws, said holder slidably arranged with respect to said conveyer, means on said holder to transfer said conveyer from one screw to the other, and means to slide said holder for effecting said transfer.

5. A mechanical movement, comprising the combination of a pair of screws spaced from each other, a rod disposed below and between said screws, a conveyer pivotally and slidably mounted thereon, said conveyer having threads and arranged to be moved into engagement with either of said screws, a holder bar slidably disposed with respect to said conveyer and arranged to engage and hold said conveyer in engagement with either screw, said bar having a pair of openings through which said conveyer may pass from one side to the other, means adjacent said openings and on said bar to transfer said conveyer from one side of said bar to the other, and means to slide said bar for effecting said transfer.

6. A mechanical movement, comprising the combination of a pair of screws spaced from each other, a rod disposed below and between said screws, a conveyer pivotally and slidably mounted thereon, said conveyer having threads thereon for engagement with either of said screws and provided with oppositely disposed inclined surfaces, a holder for maintaining said conveyer in engagement with either of said screws, said holder slidably arranged with respect to said conveyer, fingers disposed on said holder adjacent said openings and arranged to transfer said conveyer from one side of said holder to the other, and means to slide said holder for effecting said transfer.

7. A mechanical movement, comprising the combination of a pair of screws spaced from each other, a rod disposed below and between said screws, a conveyer pivotally and slidably mounted thereon, said conveyer having threads thereon for engagement with either of said screws and provided with oppositely disposed inclined surfaces, a holder for maintaining said conveyer in engagement with either of said screws, said holder slidably arranged with respect to said conveyer, and spring fingers on said holder overlying said openings, said fingers arranged to engage said inclined surface and transfer said conveyer from one side of said holder to the other, and means to slide said holder at the end of its movement.

In witness that I claim the foregoing I have hereunto subscribed my name this 9th day of August, 1916.

ORVILLE P. NORMAN.